(12) United States Patent  (10) Patent No.: US 8,884,455 B2
Reimer et al.  (45) Date of Patent: Nov. 11, 2014

(54) WAVE ENERGY CONVERTER, AND ASSOCIATED OPERATING METHOD AND CONTROL DEVICE

(71) Applicant: Robert Bosch GmbH, Stuttgart (DE)

(72) Inventors: Stefan Reimer, Berlin (DE); Nicolas Houis, Bietigheim-Bissingen (DE); Nik Scharmann, Bietigheim-Bissingen (DE); Benjamin Hagemann, Norderstedt (DE); Markus Perschall, Aschaffenburg (DE); Alexander Poddey, Wiernsheim (DE); Yukio Kamizuru, Aachen (DE); Michael Hilsch, Stuttgart (DE); Johannes Nitzsche, Hamburg (DE); Jasper Behrendt, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/917,959

(22) Filed: Jun. 14, 2013

(65) Prior Publication Data

US 2013/0334821 A1  Dec. 19, 2013

(30) Foreign Application Priority Data

Jun. 19, 2012 (DE) .......................... 10 2012 012 055

(51) Int. Cl.
 *F03B 13/10* (2006.01)

(52) U.S. Cl.
 USPC ............................... 290/53; 290/42; 416/176

(58) Field of Classification Search
 USPC ............................ 290/42, 43, 53, 54; 416/176
 See application file for complete search history.

(56) References Cited

U.S. PATENT DOCUMENTS

| 8,206,113 | B2 * | 6/2012 | Ryynanen et al. | 416/176 |
|---|---|---|---|---|
| 8,314,506 | B2 * | 11/2012 | Rhinefrank et al. | 290/53 |
| 8,659,179 | B2 * | 2/2014 | Rhinefrank et al. | 290/53 |
| 2010/0150716 | A1 | 6/2010 | Siegel | |
| 2012/0319406 | A1 * | 12/2012 | Hoffmann et al. | 290/53 |
| 2013/0229013 | A1 * | 9/2013 | Scharmann et al. | 290/53 |
| 2013/0276832 | A1 * | 10/2013 | Langner et al. | 134/18 |

OTHER PUBLICATIONS

Boyle, G., Renewable Energy, 2004, pp. 195-242 & 297-339, Oxford University Press, Oxford, UK.

* cited by examiner

*Primary Examiner* — Nicholas Ponomarenko
(74) *Attorney, Agent, or Firm* — Maginot, Moore & Beck LLP (57) ABSTRACT

A wave energy converter comprises a rotor, which is designed to convert a wave movement of a body of water, in which the wave energy converter is arranged, into a rotational movement of the rotor, wherein a mean density of at least one rotating component of the rotor can be adjusted and/or is lower than the mean density of the fluid surrounding the rotor in the body of water. The disclosure likewise relates to a corresponding control device and an operating method.

15 Claims, 5 Drawing Sheets

WAVE ENERGY CONVERTER, AND ASSOCIATED OPERATING METHOD AND CONTROL DEVICE

This application claims priority under 35 U.S.C. §119 to patent application no. DE 10 2012 012 055.9, filed on Jun. 19, 2012 in Germany, the disclosure of which is incorporated herein by reference in its entirety.

The disclosure relates to a wave energy converter comprising at least one rotor, which is designed to convert a wave movement into a rotational movement of the at least one rotor, to a method for operating a wave energy converter of this type, and also to a corresponding control device.

BACKGROUND

A range of different apparatuses are known for the conversion of energy from water movements in bodies of water into usable energy. For example, G. Boyle, "Renewable Energy", second edition, Oxford University Press, Oxford 2004 provides an overview of this. Apparatuses of this type are referred to within the scope of this application as "wave energy converters".

In wave energy converters, the energy can be extracted from the water movement in different ways. For example, buoys or floats floating on the water surface are known and drive a linear generator as a result of their rising and falling movements. In another machine concept, a planar resistance element is positioned on the seabed and is tilted back and forth by the movement of the water. The kinetic energy is converted in a generator into electrical energy for example.

Wave energy converters that are arranged with their moved parts below the water surface and that utilize a wave orbital movement present there are of particular interest within the scope of the present disclosure.

The wave orbital movement can be converted by means of rotors into a rotational movement. For this purpose, rotors with coupling members, for example in the form of lift profiles and/or Flettner rotors, can be used. A system of this type is disclosed in US 2010/0150716 A1.

The rotor with its coupling members is advantageously to be largely wave-synchronous, that is to say it is to orbit with a mean speed of rotation that corresponds to the wave orbital movement or is proportional thereto. If, for example, the rotational frequency of the rotor corresponds to the wave frequency, largely static incident flow conditions are produced at the coupling members and lead to a largely continuous torque at the rotor shaft. This can be fed directly into a generator. Excessive mechanical stresses and/or nonuniformities in the output power of the wave energy converter can thus be avoided.

In particular in the open sea, rather different wave states occur however. Bedsides what are known as deep seas, in which the waves occur very regularly, these wave states also include wave states in which the wave characteristic changes continuously as a result of the superimposition of different waves. Within the scope of this application, the first wave state is referred to as a "monochromatic" wave state, and the second wave state is referred to as a "multichromatic" wave state. Completely monochromatic wave states occur rarely in nature, and therefore the term "monochromatic" also includes waves that have a certain, albeit low, multichromatic component.

Although the wave states generally do not change suddenly and in addition can be relatively well predicted, the speed of rotation of a corresponding rotor often cannot be adapted quickly enough in practice. This is true in particular for multichromatic wave states.

The disclosure therefore attempts to create a possibility of improving the synchronizability of a wave energy converter, even in the case of multichromatic wave states.

SUMMARY

In accordance with the disclosure, a wave energy converter comprising at least one rotor, which is designed to convert a wave movement into a rotational movement of the at least one rotor, a method for operating a wave energy converter of this type and also a corresponding control device having the features described herein are proposed. Advantageous embodiments are disclosed in the following description.

The present disclosure is based on the finding that a high rotor moment of inertia of a wave energy converter is advantageous for (largely) monochromatic wave states, since said moment of inertia has a stabilizing effect on the rotor. For multichromatic wave states however, a minimal rotor moment of inertia appears to be advantageous, since in this case the speed of rotation has to be adapted frequently.

In the ideal case, the variation of the speed of rotation is to be achieved merely by a corresponding variation of the generator torque, that is to say of a (braking) counter torque to the rotor torque produced by the wave movement. If the rotor moment of inertia is high, the necessary acceleration of the rotor may, in some circumstances, not be achieved merely by a reduction of the generator torque however (and therefore by a correspondingly predominant contribution of the (driving) rotor torque). In this case, the rotor would have to be driven additionally by the generator, which is disadvantageous in terms of energy, in particular with high inertia.

Previously, it was assumed that a largely neutral hydrostatic lift of the rotor components in the water was particularly advantageous. This was considered to be important in particular for rotors of which the movable components are not distributed uniformly about the axis of rotation, since in this case preferred positions would otherwise be created, which could disturb the operation. In particular with relatively large rotor diameters, for example from 10 m to 30 m, and with the use of relatively large lift profiles having spans in the region of more than 10 m and a chord length from 1 m to 8 m, considerable rotor moments of inertia are produced however with neutral hydrostatic lift, inter alia due to the relatively large rotating masses, and oppose efficient operation with regular adaptation of the speed of rotation in multichromatic wave states. In addition, hydrostatic lift members of not insignificant size are required in previous systems in order to tension the rotor beneath the water surface with respect to an anchoring system and thus support the occurring torque for example.

Contrary to the aforementioned previous concept, the disclosure proposes the use of rotor components, in particular of lift profiles or of Flettner rotors, lever arms and the like, which have a lower mean density than the surrounding water, for example seawater. The rotor moment of inertia compared to rotors having components with neutral lift and/or greater mean density than that of the surrounding fluid is thus reduced accordingly, which leads to a much greater adjustment dynamic and therefore adaptability of the rotor to changing, in particular multichromatic, wave states.

In addition, the optimized components provided in this way function as hydrostatic lift members, which reduces the need for additional hydrostatic lift members and therefore saves system costs. In addition, the machine is smaller on the whole due to the saving of further hydrostatic lift elements and is therefore more transparent in terms of hydrodynamics.

In accordance with the disclosure, a rotor for a rotating wave power plant is therefore provided, in which the lift profiles and/or other components have a lower mean density, at least occasionally, compared to seawater. Here, the components that are arranged at a large radial distance from the rotor axis are formed accordingly in particular.

A lower mean density can be achieved for example by means of a shell-like structure, supported by struts where necessary. The enclosed air volumes lead to a considerable reduction of the mean density. Alternatively or additionally, corresponding cavities can also be filled with foam, preferably with a closed-pore foam, in order to be protected against infiltrating water.

To achieve a low mean density, fiber-reinforced plastics can also advantageously be used. In this case, the lift profiles can be fabricated completely from these materials, as is known for example from the field of wind energy. Due to the high mechanical loads occurring in particular in the field of wave energy, combinations of a supporting frame, for example formed from metal struts, with a covering formed preferably from fiber-reinforced plastics or other materials, such as textile fabrics, are also advantageous however.

With use in the rotor of components having a reduced mean density compared to water, a largely symmetrical rotor is preferably used. Here, "symmetry" is to be understood to mean that the corresponding components are distributed largely uniformly about the axis of rotation of the rotor. Due to a symmetry of this type, a preferred position of the rotor is avoided because the center of mass and center of lift coincide with the axis of rotation. This prerequisite is largely met for example in the case of a rotor having two lift profiles offset by 180° or three lift profiles offset by 120°, etc. Other arrangements may also be advantageous.

If, by contrast, the rotor were to have only one lift profile of lower density, the rotor rotation would be superimposed by periodic forces as a result of the hydrostatic lift and/or weight of said rotor. This may lead to a failure of the rotor, specifically if, during the downwards movement, the hydrostatic lift forces are greater than the forces produced by the hydrodynamic lift at this one lift profile.

Deviations from the symmetry requirement are possible within a certain scope and can be compensated for by a control/regulation unit of a corresponding wave energy converter. Deviations of this type are caused in particular as a result of the fact that different lift profiles of a rotor are often arranged at different angles of attack in relation to a rotor tangent (are "asymmetrically pitched"). In addition, the geometry of the wings can deviate from one another due to geometrical transformations for adaptation to a circular motion. To compensate for differences of this type at least within a certain scope, equalization masses, lift members and/or equalization members can be advantageously used and positioned on the rotor or the lift profiles thereof.

In a particularly advantageous embodiment, the mean density of the rotor or a corresponding component can be changed during operation. As explained previously, a high rotor moment of inertia can be advantageous for a more monochromatic wave state, whereas a substantially multichromatic operation is optimized by a reduction of the rotor moment of inertia. The mean density can be changed to a significant extent by pumping seawater into and out from cavities in the rotor components (in particular in the coupling members) or by pumping seawater around between components. Here, corresponding cavities may also be formed as chambers for example. The chambers provided in this case may also be filled with foam in part and/or flooded or bailed individually by means of corresponding devices, as is known in the case of aircraft tanks. The density of seawater (depending on salt content) is between 1020 and 1030 kg/m$^3$. The elements in question therefore have a correspondingly lower density, which can also be adapted to the respective salinity. Since wave states do not change suddenly, it appears to be advantageous, with the presence of a largely monochromatic wave state, to increase the rotor moment of inertia. In the event of the occurrence of multichromatic waves, the moment of inertia can be reduced again by pumping out seawater. Seawater is preferably pumped in and out by suitable filters in order to protect the interior of the rotor components against fouling or soiling. The increased hydrostatic lift produced by pumping completely empty the components, for example the lift profiles, can also be used to bring the wave energy converter to the water surface, for example for repairs or maintenance.

Due to the proposed change of the rotor moment of inertia, the hydrostatic lift of the rotor is naturally also changed. This change can be compensated for during operation advantageously by means of a corresponding adaptation of further hydrostatic lift members.

A particularly advantageous embodiment further comprises means, for example in the form of corresponding lines and/or pumps, which are designed to pump fluid back and forth between components of the wave energy converter, in particular between rotating and static components, in a selective and metered manner. The total mass or the cumulative lift advantageously is not changed hereby. No foreign bodies, contaminations, animals, or the like are introduced into the machine. At the same time however, this allows the influence on inertia according to the disclosure.

Reference is made to the explanations above and below with regard to features and advantages of the method likewise proposed in accordance with the disclosure.

The disclosure and preferred embodiments will be explained in greater detail hereinafter with reference to the accompanying drawings.

BRIEF DESCRIPTION OF THE DRAWINGS

In the figures, like or functionally like elements are denoted by identical reference signs. A repeated explanation is not provided.

DETAILED DESCRIPTION

Figure 1:
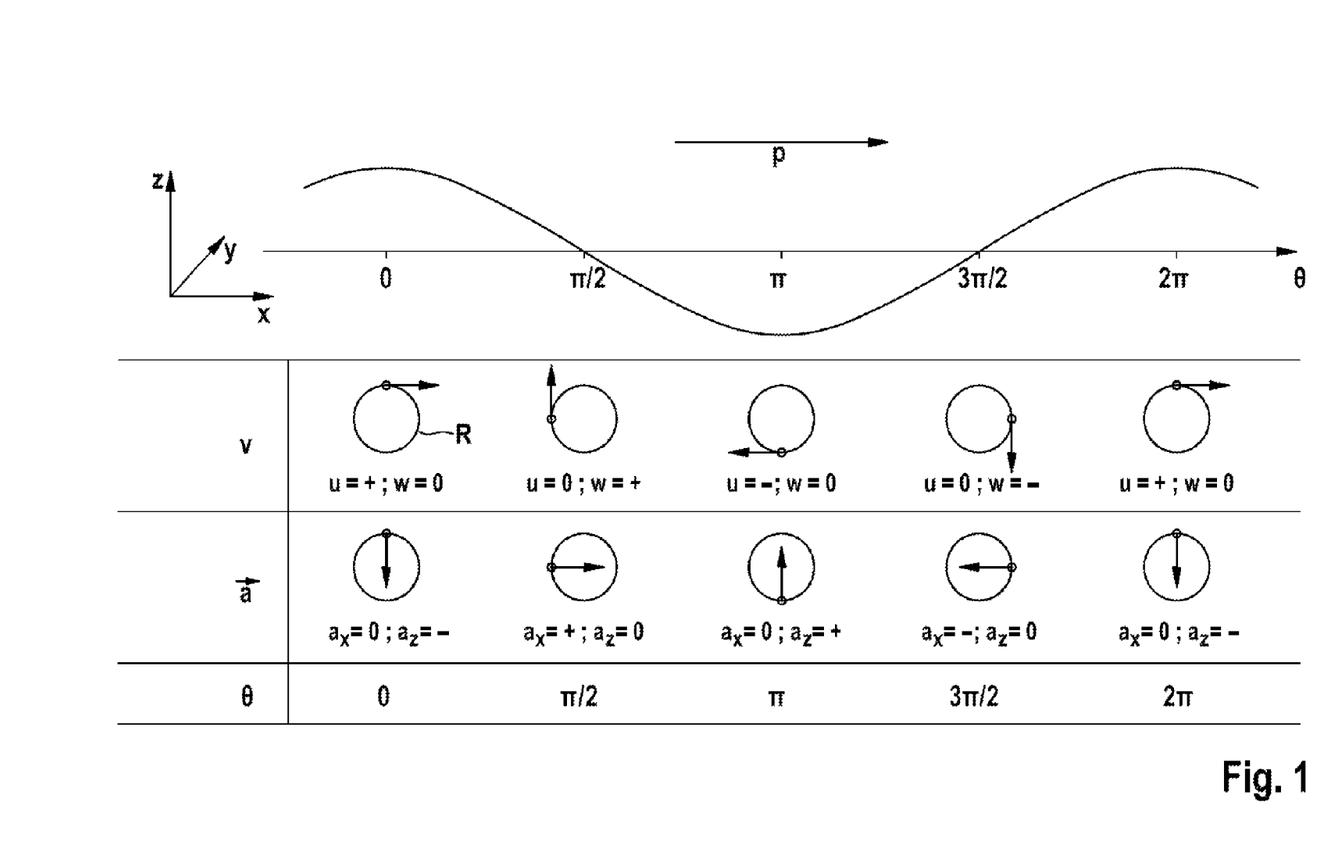
FIG. 1 shows a schematic illustration of velocities and accelerations of water particles below the surface of a body of water moved in a waved manner.
Figure 2A:
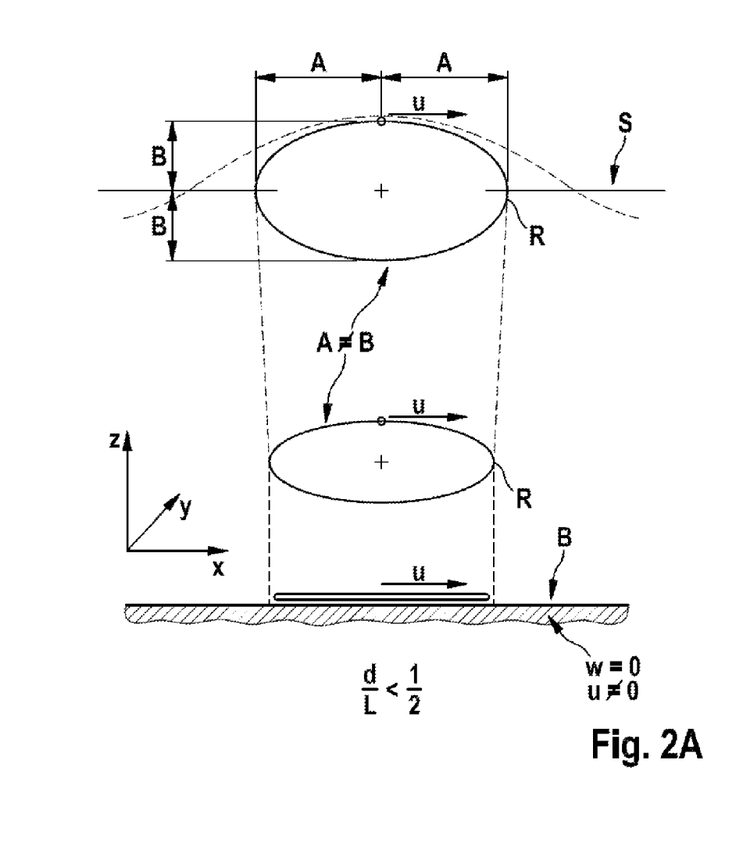
FIG. 2A shows a schematic illustration of wave orbital movements below the surface of a body of water moved in a waved manner in shallow water.
Figure 2B:
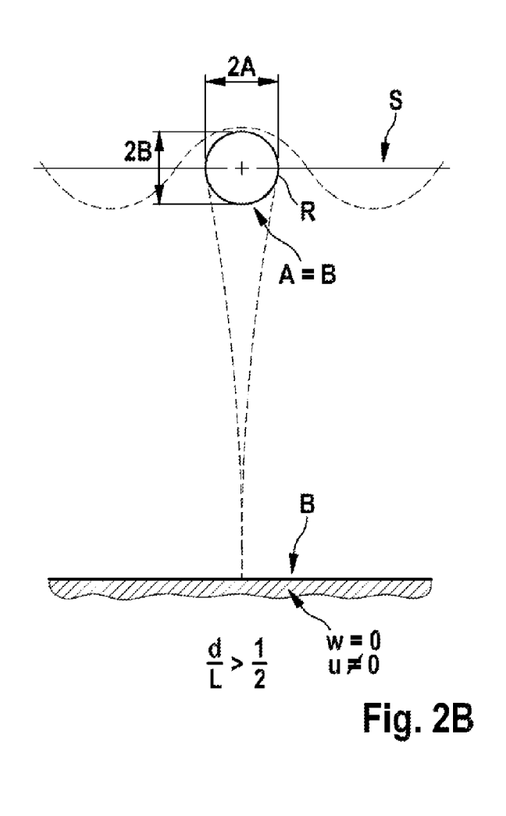
FIG. 2B shows a schematic illustration of wave orbital movements below the surface of a body of water moved in a waved manner in deep water.

FIG. 1 shows (local) velocities $\vec{v}$ and accelerations $\vec{a}$ of water particles below the surface of a body of water moved in a waved manner, for example in the sea, in the form of horizontal components u and vertical components w of the local water movement and also of the associated horizontal and vertical accelerations $a_x$ and $a_z$. In this case, the radial or orbital paths R are provided, which, as explained in FIG. 2, in deep water are circular and in shallow water increasingly adopt the shape of ellipses. The wave propagates in a direction of propagation p and is assumed in a simplified manner to be sinusoidal.

The coordinate system specified in FIG. 1 is also used in FIG. 2. The coordinate axis x corresponds to the direction of wave propagation parallel to the water surface, and the coordinate axis z corresponds to the vertical to the water surface. The coordinate axis y runs parallel to the water surface and perpendicular to the direction of wave propagation.

At a wave crest (0. π), all the water particles move in the direction of wave propagation p (there is thus only a horizontal movement component u present), and at a wave trough (1. π), said water particles move against this direction (referred to hereinafter as –u). Here, the vertical movement components are zero. At π/2 and 3π/2, that is to say the zero crossings of a corresponding wave function, there is no horizontal movement; the water particles move exclusively upwards (movement component w) or downwards (movement component –w). The movement may be superimposed however by a current.

FIG. 2 shows the radial or orbital paths R in shallow water in sub-FIG. 2A and in deep water in sub-FIG. 2B. In shallow water (sub-FIG. 2A), the horizontal components u exceed the vertical components w of the local water movement in terms of amount. The horizontal extent (2·A) of the orbital paths R is always greater than the vertical extent (2·B) thereof, and therefore A≠B. At the bottom of the body of water, the vertical component w of the local water movement is zero, that is to say there is only still a horizontal movement present.

By contrast, in deep water (sub-FIG. 2B), A=B. The radii reduce however starting from the mean water surface S to the bottom B of the body of water.

Wave graphs of monochromatic and multichromatic wave states in a body of water moved in a waved manner are illustrated in FIGS. 3a-3d. In the graphs depicted in FIGS. 3a and 3b, an amplitude is plotted on the ordinate in relation to a wave frequency in Hz on the abscissa. In the graphs depicted in FIGS. 3c and 3d, a wave rise or fall in m for a fixed position ("sea condition") is plotted on the ordinate in relation to a time in s on the abscissa.

Figure 3A:
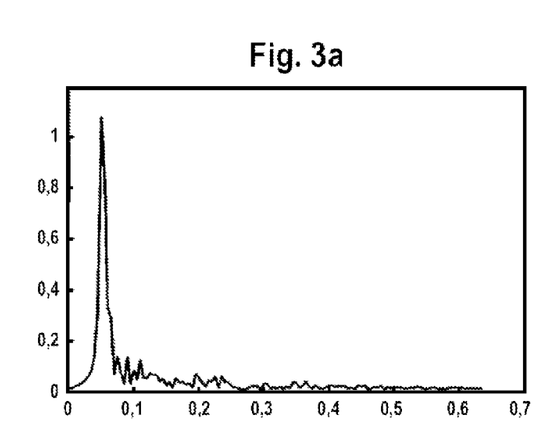
FIG. 3a shows a wave graph of an amplitude plotted in relation to a wave frequency in Hz for a monochromatic wave state in a body of water moved in a waved manner.
Figure 3B:
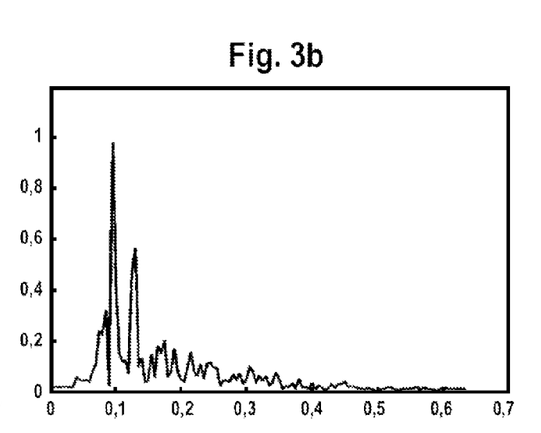
FIG. 3b shows a wave graph of an amplitude plotted in relation to a wave frequency in Hz for a multichromatic wave state in a body of water moved in a waved manner.
Figure 3C:
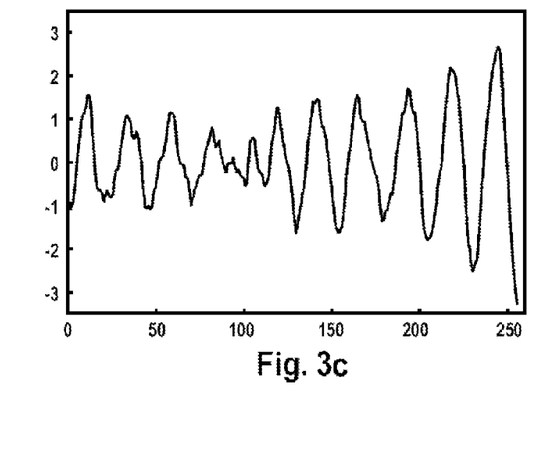
FIG. 3c shows a wave graph of a wave rise or fall in m for a fixed position plotted in relation to a time in s for a monochromatic wave state in a body of water moved in a waved manner.
Figure 3D:
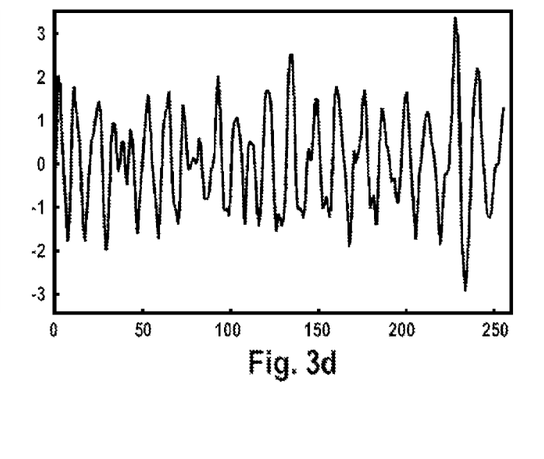
FIG. 3d shows a wave graph of a wave rise or fall in m for a fixed position plotted in relation to a time in s for a multichromatic wave state in a body of water moved in a waved manner.

In the graphs of FIGS. 3a and 3c, a largely monochromatic wave state is illustrated, whereas the graphs of FIGS. 3b and 3d by contrast illustrate a multichromatic wave state, which is produced from the superimposition of two main frequencies and also an addition of further frequency components.

For the case illustrated in the graphs of FIGS. 3a and 3c with just low fluctuations of the period, it can be seen that, with accordingly adapted (specifically slightly fluctuating) rotational speed of a rotor, largely constant flow conditions can be set at the lift profiles.

For the case illustrated in the graphs of FIGS. 3b and 3d, this is not to be expected. Due to the complexity of the wave state, there is in this case the need to change the speed of rotation of the rotor largely continuously in order to produce at the wings incident flow conditions that generate at the rotor a driving torque, which can be tapped and converted by means of the generator.

As mentioned, a high rotor moment of inertia can be advantageous for largely monochromatic wave states, since this has a stabilizing effect on the rotor. For multichromatic states however, a minimal rotor moment of inertia appears to be advantageous, since in this case the speed of rotation has to be adapted frequently.

Figure 4:
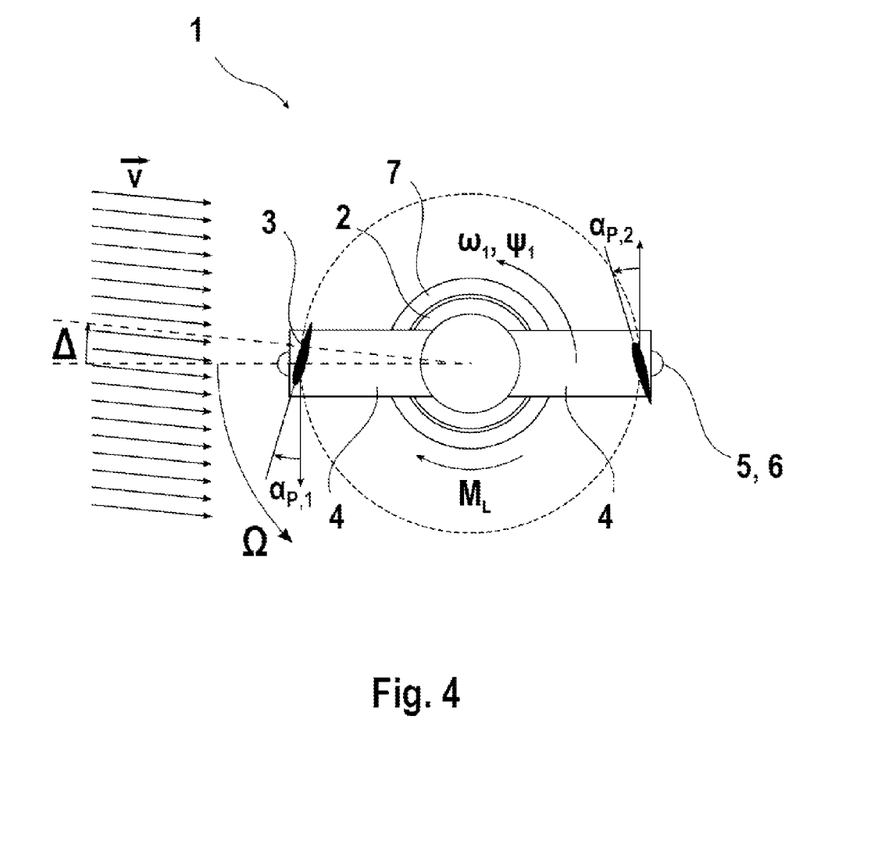
FIG. 4 shows a schematic illustration of a wave energy converter in accordance with an embodiment of the disclosure in a body of water moved in a waved manner.

FIG. 4 illustrates a wave energy convertor 1, as may form the basis of the present disclosure, with a housing 7 and a rotor 2, 3, 4 mounted rotatably thereon with a rotor base 2 and two coupling members 3 each fastened via lever arms 4 to the rotor base 2 in a rotationally engaged manner. The rotor 2, 3, 4 is arranged below the water surface of a waved body of water, for example of an ocean. In this case, deep-water conditions are present for example, under which the orbital paths of the water molecules run largely in a circular manner. An axis of rotation of the rotor (perpendicular to the paper plane) is oriented largely horizontally and largely perpendicularly to the direction of propagation of the waves of the waved body of water. The coupling members 3 are formed as hydrodynamic lift profiles in the example shown. At least some of the rotating components of the wave energy converter 1 may preferably have a lower mean density, at least occasionally, than the surrounding water in order to minimize a moment of inertia, as explained. This is true in particular for components of the rotor 2, 3, 4 distributed uniformly about the axis of rotation, for example the coupling members 3 and/or the lever arms 4 in the case of the wave energy converter 1, such that there is no asymmetry in this regard and therefore no preferred position.

The coupling members 3 are arranged at an angle of approximately 180° relative to one another. The coupling members 3 are preferably mounted in the vicinity of their center of pressure in order to reduce rotational torques on the coupling members 3 occurring during operation and therefore so as to reduce the demands on the mount and/or the adjustment devices.

The radial distance between a fixing point of a coupling member 3 and the rotor axis is 1 m to 50 m, preferably 2 m to 40 m, and more preferably 6 m to 30 m. The chord length of the coupling members 3 is 1 m to 8 m for example. The span (perpendicular to the paper plane) may be 6 m or more for example. The wave energy converter is also suitable for use with two-sided rotors or what are known as squirrel-cage rotors, in which coupling members 3 with corresponding or adapted spans are each attached in the axial direction on both sides to a rotor base 2 or between two rotor bases 2 via the explained lever arms 4.

Two adjustment devices 5 for adjusting the angle of attack or pitch angle $\alpha_{P,1}$ and $\alpha_{P,2}$ of the two coupling members 3 relative to the tangent to the rotor are shown here running perpendicularly upwards and downwards. The two angles of attack $\alpha_{P,1}$ and $\alpha_{P,2}$ are preferably oriented in opposite directions and for example have values from −20° to +20°. In particular when starting the wave energy convertor 1, greater angles of attack may also be provided however. The angles of attack $\alpha_{P,1}$ and $\alpha_{P,2}$ may preferably be adjusted independently of one another. The adjustment devices may be adjustment devices comprising an electric motor for example (preferably with stepper motors) and/or may be hydraulic and/or pneumatic components.

The two adjustment devices 5 may additionally each be assigned a sensor 6 for determining the current angle of attack $\alpha_{P,1}$ and $\alpha_{P,2}$. A further sensor (not illustrated) can determine the angle of rotation of the rotor base 2 relative to the housing 7.

The wave energy converter disclosed herein is also suitable for systems without adjustment devices 5 for adjusting the angle of attack or pitch angle $\alpha_{P,1}$ and $\alpha_{P,2}$ and/or corresponding sensors and/or for wave energy convertors based on different operating principles, such as Flettner rotors. As is known, Flettner rotors are drives in the form of a rotating cylinder that is exposed to a flow and that generates a force transversely to the incident flow by means of the Magnus effect. For example, cylinders formed from sheet metal arranged normal or horizontal and perpendicular to the direction of flow and rotatable by means of a drive and preferably having end discs are concerned in this case. The generated force can be influenced by influencing the speed of rotation.

The orbital flow flows against the wave energy converter 1 at an incident flow velocity $\vec{v}(t)$. The incident flow here is the orbital flow of sea waves, of which the direction changes continuously with an angular velocity $\Omega$. In the illustrated case, the rotation of the orbital flow is oriented in an anticlockwise direction, therefore the respective wave propagates from right to left. In the monochromatic case, the incident flow direction changes here with the angular velocity $\Omega=2\pi f=\text{const.}$, wherein f is the frequency of the monochromatic wave. In multichromatic waves, $\Omega$ by contrast undergoes a change over time $\Omega=f(t)$, since the frequency f is a function of time, $f=f(t)$. The rotor 2, 3, 4 rotates synchronously with respect to the orbital flow of the wave movement with an angular velocity $\omega_1$, wherein the term "synchronicity" is to be understood as an average over time. In this case, $\Omega \approx \omega_1$ for example. A value or a value range for an angular velocity $\omega_1$ of the rotor is thus predefined on the basis of an angular velocity $\Omega$ of the orbital flow or is adapted thereto. In this case, a temporary or short-term adaptation (for example with a superimposed angular velocity cop can be regulated constantly.

For quick adaptation, the coupling members 3 and/or lever arms 4 are to be formed in accordance with the disclosure in such a way that their mean density is at least occasionally lower than the surrounding fluid. The inertia of the rotor 2, 3, 4 is thus reduced.

Due to the effect of the flow having the incident flow velocity $\vec{v}$ on the coupling members, as explained in greater detail below, a first torque acting on the rotor 2, 3, 4 is produced. In addition, a preferably changeable second torque in the form of a resistance, that is to say a braking torque, or in the form of an acceleration torque, can be applied to the rotor 2, 3, 4. A prerequisite for a torque of this type is a support means (mooring system) integrated into the machine. With low rotor inertia, the energy expenditure for an acceleration of the rotor by means of an acceleration torque reduces. Means for producing the second torque are arranged between the rotor base 2 and the housing 7. Here, the housing 7 is preferably the stator of a direct-driven generator, and the rotor basis 2 is the rotor thereof, of which the bearing, windings, etc. are not illustrated. In this case, the second torque is determined by the generator torque. Alternatively, other drivetrain variants can also be provided however, in which the means for producing the second torque also comprise, besides a generator, a transmission and/or hydraulic components, such as pumps. A suitable brake may also be provided, either in addition or exclusively.

Figure 5:
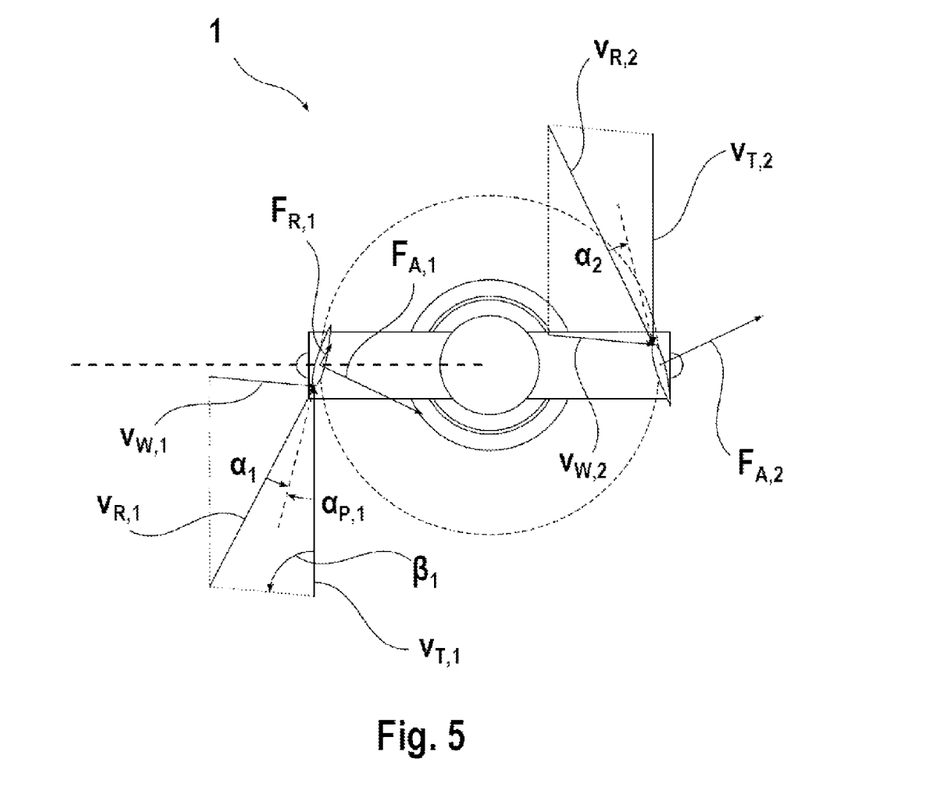
FIG. 5 shows a schematic illustration of resultant forces acting on the wave energy converter according to FIG. 4.

A phase angle $\Delta$, of which the value can be influenced by the adjustment of the first and/or of the second torque, exists between the rotor orientation, which is illustrated by a lower dashed line and which runs through the rotor axis and through the middle of the two adjustment devices 5, and the direction of the orbital flow, which is illustrated by an upper dashed line and which runs through one of the velocity arrows $\vec{v}$. Here, a phase angle from −45° to 45°, preferably from −25° to 25°, and more preferably from −15° to 15°, for producing the first torque appears to be particularly advantageous, since in this case the orbital flow and the incident flow are oriented so as to be largely perpendicular to one another due to the inherent rotation $v_R$ (see FIG. 5), which leads to a maximization of the rotor torque. If the required synchronicity is maintained, $\alpha \approx \text{const.}$, wherein an oscillation about a mean value of $\alpha$ is understood to be synchronous. The coupling elements are illustrated in FIGS. 4 and 5 merely by way of example for definition of the different machine parameters. During operation, the angle of attack of the two coupling members 3 may therefore also be opposite compared to that shown in the illustration. The left coupling member in FIG. 4 would then be adjusted inwardly, and the right coupling member in FIG. 4 would then be adjusted outwardly. Here, in contrast to this schematic illustration with uncurved, symmetrical profiles, the use of other profile geometries may also be possible, which can additionally also still be adapted and/or transformed with regard to the circular path.

Within the scope of the disclosure, $\vec{v}$ and $\Omega$ for example can be predetermined, such that a preliminary control of the first and/or second torque can be carried out accordingly. The first torque is influenced substantially via the angles of attack $\alpha_{P,1}$ and $\alpha_{P,2}$ and also via the phase angle $\Delta$ between rotation $\omega$ and orbital flow $\Omega$ and the resultant incident flow velocity, and the second torque is influenced substantially via the torque tapped by the generator, which for example can be influenced by a default setting of the excitation current of the rotor. When determining monochromatic wave states, the mean density of the components of the rotor 2, 3, 4 can be increased, or by contrast reduced when determining multichromatic wave states. This can be achieved for example by pumping water into or out from coupling members 3 formed as hollow profiles.

In FIG. 5, the occurring incident flow conditions and forces at the coupling elements, which lead to a rotor torque, are illustrated schematically. Here, it is assumed in a simplified manner that the flow is uniformly pronounced over the entire rotor cross section and has a constant value and a constant direction. In particular for rotors having large radial extents, it may be however, precisely in the case of the illustrated horizontal orientation of the lever arms 4, that the various coupling members 3 of the rotor 2, 3, 4 are located at different positions relative to the wave, which leads to an incident flow direction that differs locally. This can be compensated for however with the aid for example of an individual adjustment of the respective angle of attack $\alpha_{P,i}$.

On the coupling members illustrated to the left in FIG. 5, the local incident flows are represented by the orbital flow $v_{W,1}$ and by the inherent rotation $v_{T,1}$, the incident flow velocity $v_{R,1}$ resulting as a vector sum from these two incident flows, and also by the angle of incidence $\alpha_1$. The lift and resistance forces $F_{A,1}$ and $F_{R,1}$ at these coupling members, which are dependent on the value of the incident flow velocity $v_{T,1}$ and also on the angle of incidence $\alpha_1$ and therefore also on the angle of attack $\alpha_{P,1}$ and are oriented perpendicular or parallel to the direction of $v_{R,1}$, are additionally derived. With regard to the coupling member illustrated to the right in FIG. 5, only some of these parameters are specified and provided with the index 2 for reasons of clarity.

For the illustrated case, a rotor torque in an anti-clockwise direction is produced as a result of the two lift forces $F_{A,1}$ and $F_{A,2}$, and a smaller rotor torque in the opposite direction (that is to say in the clockwise direction) is produced as a result of the two resistance forces $F_{W,1}$ and $F_{W,1}$ (not illustrated). The sum of both rotor torques leads to a rotation of the rotor 2, 3, 4, of which the velocity can be adjusted by means of the adjustable second torque. As can be seen, a significant proportion of the forces acts radially and should be supported by a suitable restraint system.

If a synchronicity with $\Delta\approx$const. is achieved, it can thus be seen directly from FIG. 5 that, for monochromatic cases, in which the value of the flow $v_{W,1}$ or $v_{W,2}$ and the angular velocity $\Omega$ remain largely constant (under consideration of the deep water and shallow water effects explained previously), the incident flow conditions of the two coupling members 3 do not change via the rotation of the rotor. This means that, with constant angles of attack $\alpha_{P,1}$ and $\alpha_{P,2}$, a largely constant rotor torque is produced, which can be tapped with a constant second torque of a corresponding generator. By contrast, in the case of multichromatic waves, changes occur, which can be taken into consideration by adapting the angles of attack and/or the second torque. An adaptation of $\omega_1$ is achieved in a particularly advantageous manner by means of a low inertia of the rotor.

What is claimed is:

1. A wave energy converter comprising:
   a rotor configured to convert a wave movement of a body of water, in which the wave energy converter is disposed, into a rotational movement of the rotor,
   wherein the rotor includes at least one rotating component, and
   wherein a mean density of the at least one rotating component of the rotor is adjustable and/or is lower than a mean fluid density of a fluid surrounding the rotor in the body of water.

2. The wave energy converter according to claim 1, wherein the at least one rotating component includes at least one of a rotor base, a lever arm, and at least one coupling member of the rotor that couples with the wave movement.

3. The wave energy converter according to claim 1, wherein the at least one rotating component includes two components of the rotor arranged substantially symmetrically about an axis of rotation of the rotor.

4. The wave energy converter according to claim 3, further comprising:
   a compensation mechanism configured to compensate for differences in mean densities of the at least two components of the rotor distributed uniformly about an axis of rotation of the rotor.

5. The wave energy converter according to claim 1, wherein the at least one rotating component of the rotor is formed in shell construction.

6. The wave energy converter according to claim 5, wherein the at least one component formed in shell construction includes at least one of (i) a shell formed from at least one of a composite material and a textile material and (ii) at least one of reinforcing struts and a foam filling in an interior of the at least one component formed in shell construction.

7. The wave energy converter according to claim 5, further comprising:
   a pumping device configured to pump a fluid into or out from the at least one component formed in shell construction so as to adjust a mean density of said at least one component formed in shell construction.

8. The wave energy converter according to claim 7, wherein the pumping device, in order to pump the fluid into or out from the at least one component formed in shell construction, includes at least one filter device configured to filter at least the fluid pumped into the at least one component formed in shell construction.

9. The wave energy converter according to claim 7, further comprising:
   at least one further component,
   wherein the pumping device, in order to pump the fluid into or out from the at least one component formed in shell construction, is configured to pump the fluid between the at least one component formed in shell construction and the at least one further component.

10. The wave energy converter according to claim 5, wherein the at least one rotating component of the rotor is at least partly hollow.

11. The wave energy converter according to claim 7, wherein the at least one further component is a stationary component.

12. A method for operating a wave energy converter, which has a rotor having at least one rotating component and is configured to convert a wave movement of a body of water, in which the wave energy converter is disposed, into a rotational movement of the rotor, said method comprising:
    establishing and/or predicting at least one wave state in the body of water in which the wave energy converter is disposed; and
    adjusting, on the basis of the established and/or predicted wave state, a mean density of the at least one rotating component of the rotor of the wave energy converter.

13. The method according to claim 12, further comprising:
    increasing the mean density of the at least one rotating component of the rotor of the wave energy converter if the at least one wave state established and/or predicted is monochromatic; and/or
    reducing the mean density of the at least one rotating component of the rotor of the wave energy converter if the at least one wave state established and/or predicted is polychromatic.

14. The method according to claim 13, further comprising:
    operating the rotor with a mean speed of rotation largely synchronously with respect to a water movement in the body of water by at least one of braking and accelerating the rotor.

15. A control device for a wave energy converter, which has a rotor with at least one rotating component and is configured to convert a wave movement of a body of water, in which the wave energy converter is disposed, into a rotational movement of the rotor, said control device being configured to (i) establish and/or predict at least one wave state in the body of water in which the wave energy converter is disposed, and (ii) adjust, on the basis of the established and/or predicted wave state, a mean density of the at least one rotating component of the rotor of the wave energy converter.

* * * * *